G. M. WILLIAMS.
TOOL FOR TIGHTENING AND FASTENING BALE BANDS.
APPLICATION FILED JAN. 3, 1916.
1,241,483.
Patented Sept. 25, 1917.
5 SHEETS—SHEET 1.
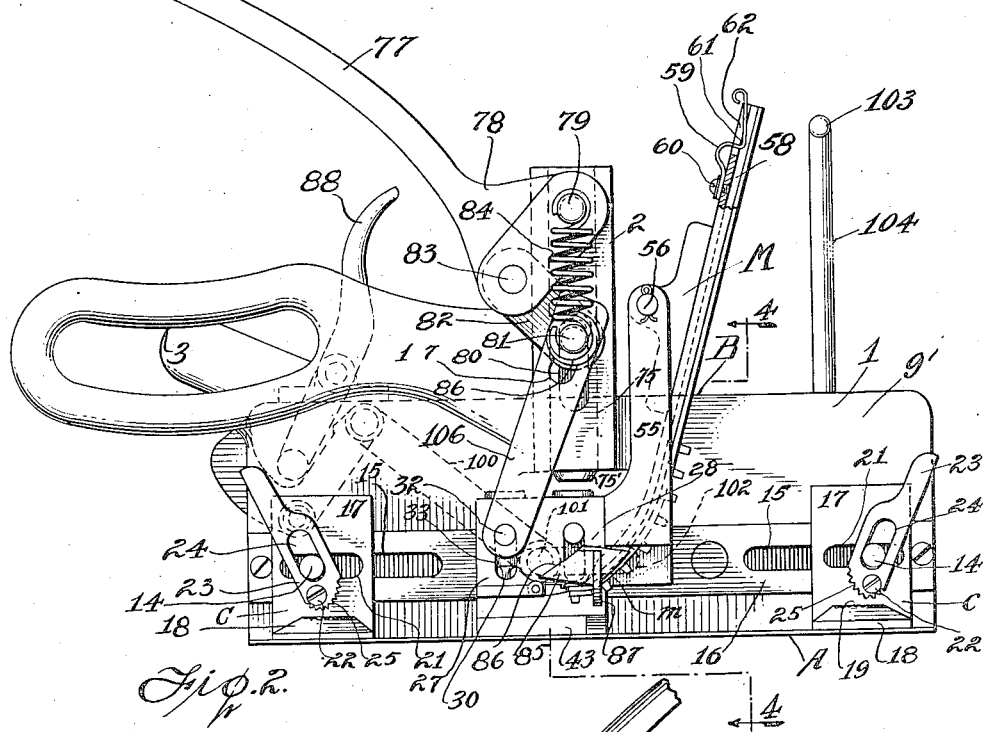
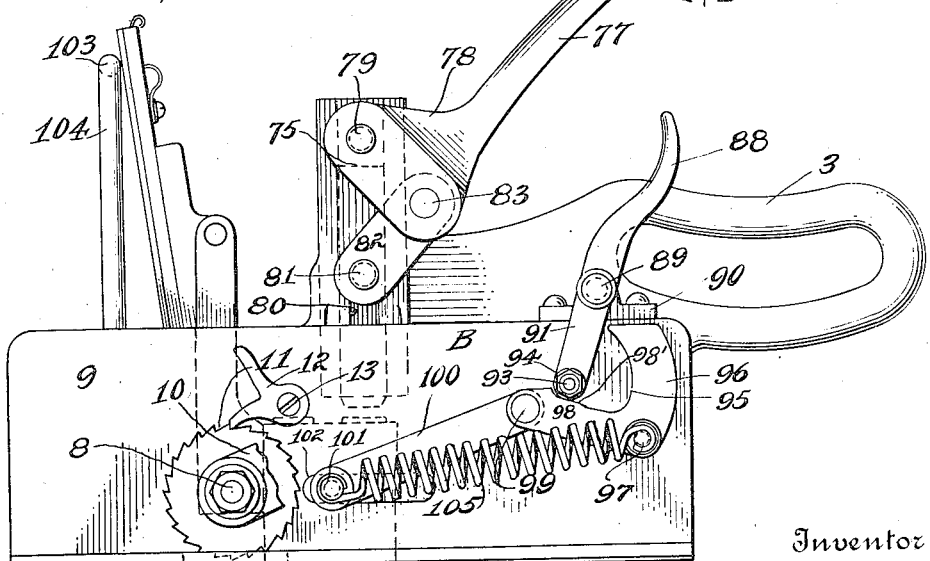
Inventor
George M. Williams.
By his Attorneys
Meyers, Cushman & Rea

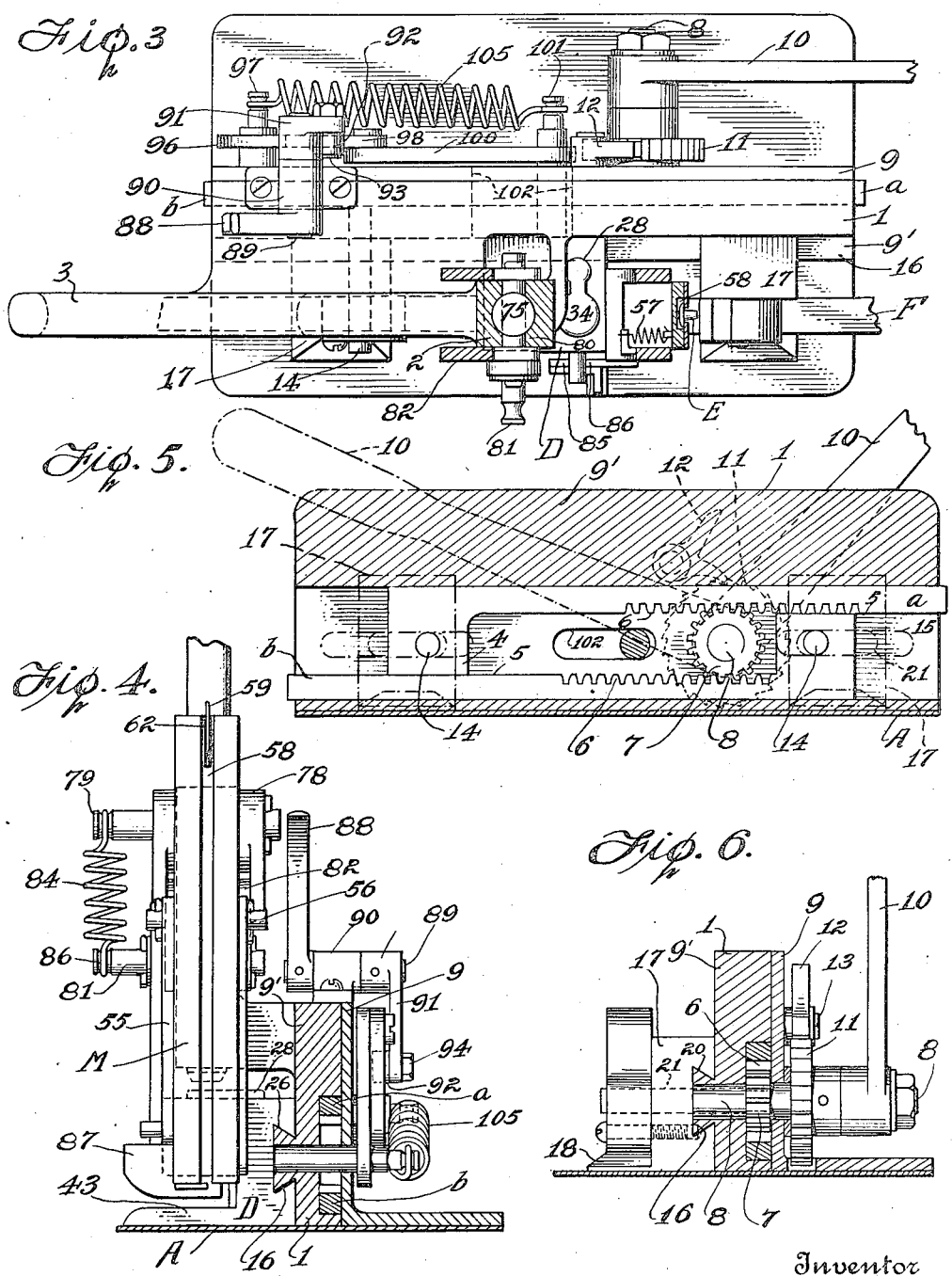

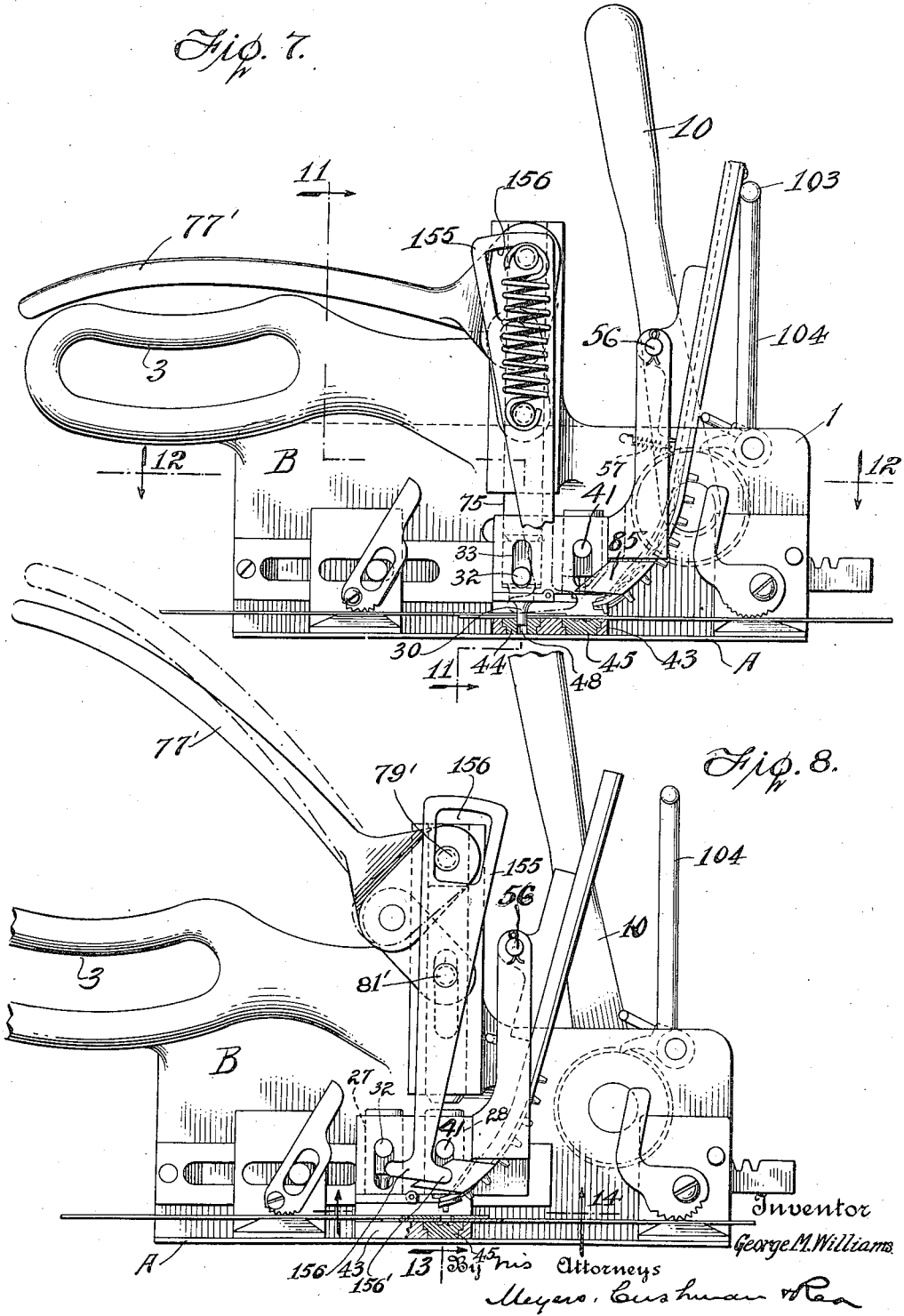

G. M. WILLIAMS.
TOOL FOR TIGHTENING AND FASTENING BALE BANDS.
APPLICATION FILED JAN. 3, 1916.
1,241,483.
Patented Sept. 25, 1917.
5 SHEETS—SHEET 4.
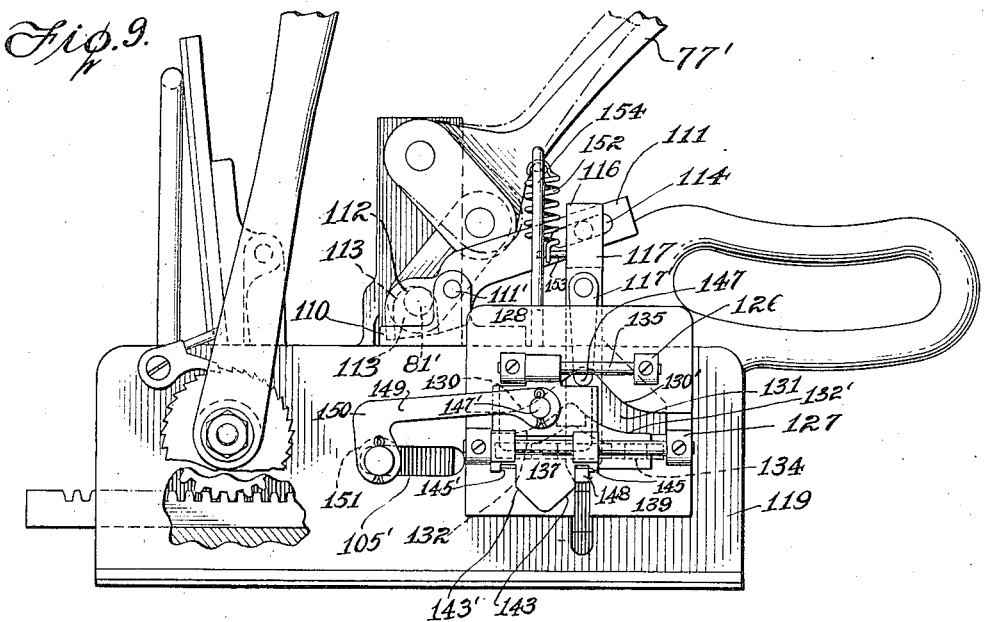
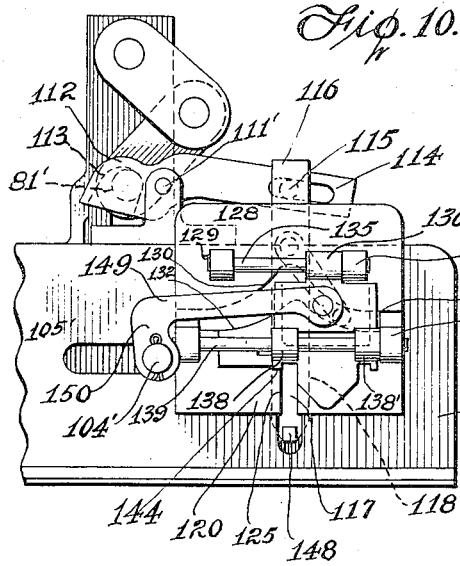
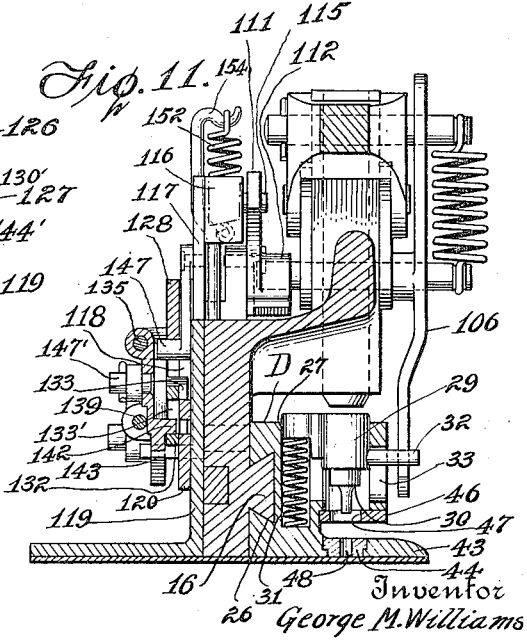
Inventor
George M. Williams
By his Attorneys
Meyers, Cushman & Rea

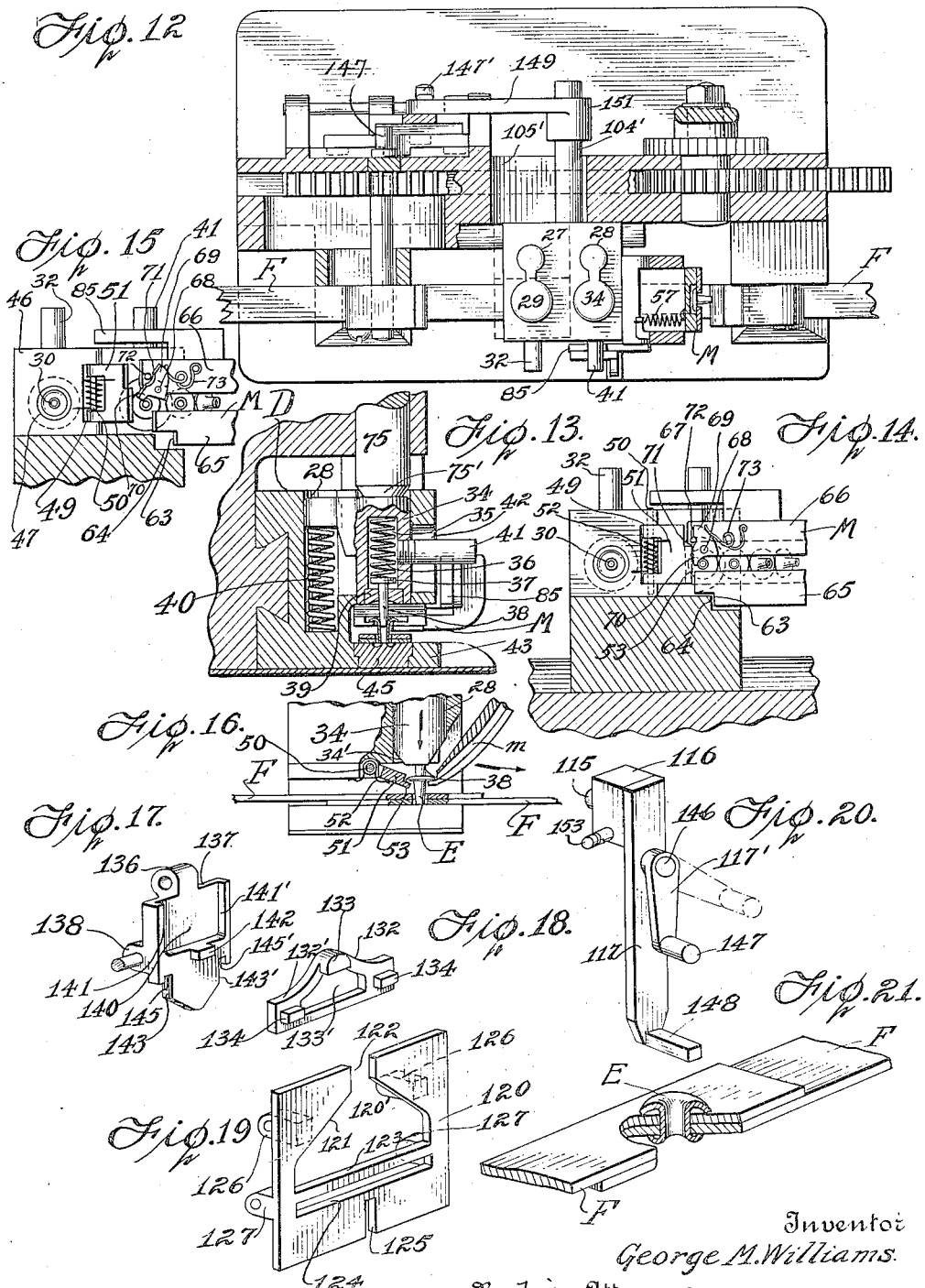

UNITED STATES PATENT OFFICE.

GEORGE M. WILLIAMS, OF ELIZABETH, NEW JERSEY, ASSIGNOR TO P. LORILLARD COMPANY, OF NEW YORK, N. Y., A CORPORATION OF NEW JERSEY.

TOOL FOR TIGHTENING AND FASTENING BALE-BANDS.

1,241,483.

Specification of Letters Patent.  Patented Sept. 25, 1917.

Application filed January 3, 1916. Serial No. 69,845.

*To all whom it may concern:*

Be it known that I, GEORGE M. WILLIAMS, a citizen of the United States, residing at Elizabeth, in the county of Union, State of New Jersey, have invented new and useful Improvements in Tools for Tightening and Fastening Bale-Bands, of which the following is a specification.

This invention relates to a tool for tensioning a bale band and for securing or uniting the ends of the tensioned band to adapt the latter as a binder for the bale.

In speaking of this device as a tool for tensioning and securing a bale band I wish it to be understood as including a tool for fastening any sort of strap, band, or stay strip intended to serve as a binder for a bale, box, crate or other form of package.

In the present instance it is my purpose to provide a tool through the agency of which a band, such as a metallic bale band, may be tensioned or drawn taut about the bale and its end portions prepared for connection and then united while such end portions are positively held under tension.

A further object of the invention is the provision of a tool of this type operable first: to grip the ends of a band constituting a bale binder and to exert sufficient tension or pull upon such ends to draw the band tightly about the bale to bring these ends into overlapping relation; second, to punch or perforate the overlapping ends of the band to provide openings for the reception of suitable fastening means, preferably eyelets or rivets; and third, to apply and secure the fastening means in the perforated ends to unite the latter, the tension upon the band ends being constantly maintained by the tool during the punching or perforating and the fastener applying and securing operation, such tension being only released when the work of fastening the band about the bale has been completed.

I also propose to provide a band tensioning and securing tool which is unitary in the sense that the various sub-mechanisms or devices, such as the band gripping and tensioning devices, the punching or perforating mechanism and the fastener applying and securing means are all incorporated in a single structure, thus enabling the band to be readily, speedily and positively tensioned and fastened or sealed about the bale to bind the latter, thus obviating the delay and inconvenience incident to the employment of a plurality of separate tools as is now the general practice in bale binding operations.

Furthermore, I propose to provide a portable band tensioning and fastening tool which will embody the desired features of simplicity, efficiency and durability coupled with strength and power, and which may be manufactured and marketed at a relatively low cost.

With the above recited objects and others of a similar nature in view my invention consists in the construction, combination and arrangement of parts set forth and falling within the scope of the appended claims.

In the accompanying drawings—

Figure 1, is a view in side elevation of a manually operable tool embodying my invention.

Fig. 2 is a similar view looking at the opposite side of the tool.

Fig. 3 is a view partly in top plan and partly in section of the tool shown in Figs. 1 and 2.

Fig. 4 is a vertical sectional view taken on a line 4—4 of Fig. 1.

Fig. 5 is a longitudinal sectional view taken through the tool shown in Fig. 1 and illustrating the mechanism for moving the devices which clamp and tension the band, certain parts being omitted for clearness.

Fig. 6 is a cross sectional view thereof.

Fig. 7 is a view in side elevation of a modified form of tool and showing the latter in band tensioning and band perforating position, the anvil plate being shown in section.

Fig. 8 is a similar view of this modified form, but showing the tool in position ready to apply an eyelet to unite the overlapping ends of the band.

Fig. 9 is a view in elevation of the opposite side of the modified tool from that shown in Figs. 5 and 6, a portion of the tool housing being broken away.

Fig. 10 is an enlarged detail view in side elevation of the modified tool shown in Fig. 7 and illustrating certain parts of the mechanism for shifting the punch carrying head block.

Fig. 11 is a vertical sectional view of the modified tool taken on the line 11—11 of Fig. 7.

Fig. 12 is a horizontal longitudinal sectional view of such modified tool taken on the line 12—12 of Fig. 7.

Fig. 13 is a vertical sectional view taken through the eyelet setting machine on the line 13—13 of Fig. 8, this view being applicable to both the preferred and the modified forms of the invention.

Fig. 14 is a horizontal sectional view taken on the line 14—14 of Fig. 8 and showing one position of the spring tension stop plate at the discharge end of the eyelet magazine, such view being also applicable to both forms of the invention.

Fig. 15 is a view similar to Fig. 14 but showing such spring tensioned stop plate in another position.

Fig. 16 is a detail view partly in section and partly in elevation and showing how the eyelet is positioned and guided when the eyelet setting punch is about to set the eyelet to connect the overlapping band ends.

Figs. 17, 18, 19 and 20 are detail perspective views of certain parts of the tool shown in the modified form of the invention.

Fig. 21 is a perspective view, partly in section and showing two overlapping band ends united by an eyelet applied with my band tensioning and fastening tool.

The tool forming the subject matter of the present invention is particularly adapted for use in tensioning metallic bands or straps about bales, boxes, crates or other forms of packages, and fastening together, or uniting the ends of the bands by means of eyelets. Briefly, this tool, in its preferred form embodies among other features a suitable frame carrying a plurality of spaced and movable clamping devices adapted to grip the opposing ends of a band, which has been placed about the bale, and to draw said ends toward each other and preferably into overlapping relation. While the ends are thus positioned and held under tension by the clamping devices they are punched or perforated by the operation of the perforating mechanism to provide alining holes or openings for the reception of a fastening device, which is preferably though not necessarily in the nature of an eyelet. After the perforating operation is completed the perforating mechanism is shifted to one side, or away from the perforations in the band ends, and the eyelet setting mechanism brought into position directly above the perforations in the band ends so that when this eyelet setting mechanism is operated an eyelet will be fed from the magazine, inserted through the alining perforations in the overlapping band ends and upset to securely unite the ends of the band. The tension and clamping action of the tool on the band may now be released, and the tool removed and employed to fasten other bands.

Referring now to the accompanying drawings in detail, and particularly to Figs. 1-6 inclusive, which illustrate the preferred embodiment of the invention, and to Figs. 13-16 inclusive which show certain details of construction that are inherent in both the preferred and the modified forms of the invention, the letter A designates the base or bed plate of the tool on which is mounted a frame or main casting indicated as an entirety by the letter B. This frame includes the housing 1, which in the present instance is preferably of rectangular form and carries the upstanding tubular post 2 as well as the handle 3, the latter being employed for the convenient manipulation of the tool. The housing is open at both ends to permit the outer end portions of the rack bars *a* and *b* to slidingly project there through as shown in Fig. 5.

The band clamping and tensioning devices of the tool include the said rack bars *a* and *b* which are slidingly arranged within the housing. As will be seen by reference to Fig. 5 each rack bar is approximately L shaped in form by reason of having a head plate 4 at one end thereof extending at right angles to the body of the bar, the head plate of one bar being oppositely disposed relative to the head plate of the other bar so that the head plate of one bar will bear against the untoothed portion 5 of its companion bar. Furthermore, as the two bars are reversely positioned relative to each other one head plate will be disposed adjacent to one end of the housing while the other head plate will be disposed adjacent to the opposite end of the housing. The intermediate portions of these rack bars *a* and *b*, which of course are spaced apart in parallelism, are provided with teeth or rack sections 6, while 7 indicates a pinion wheel interposed between the rack bars and engaging the teeth or rack sections of the latter. This pinion wheel 7 is mounted on a shaft 8 which extends through the wall 9 of the housing, this wall forming a bearing for the shaft. Fast with the outer end of the shaft 8 is a hand lever 10 for the purpose of rotating or turning the shaft 8 sufficiently to drive the pinion 7 and cause the rack bars *a* and *b* to travel in opposite directions. A ratchet wheel 11, also connected to turn with the shaft, is mounted on the latter between the wall 9 and the lever 10, and this ratchet wheel is adapted to co-act with the pawl 12 pivoted at 13 to the wall 9, to hold the shaft against backward rotation. Each rack bar head-plate 4 carries a laterally projecting stud 14 which projects through and beyond the adjacent elongated, horizontally-disposed slot 15 formed in the wall 9' of the housing. It will be noted that these two elongated slots 15 are spaced apart a considerable distance, being located adjacent to the ends of the wall 9', and they open through the horizontal dovetailed flange 16 formed integral with the outer face of the wall 9'. This dovetailed flange is adapted to form a support and guide for the two clamps c, each clamp having a vertically disposed block 17 carrying at its lower end a horizontally disposed outwardly extending foot plate 18, the upper face of which is preferably roughened as at 19, to provide a good gripping surface. The rear wall of each clamp block has a dovetailed recess 20 cut therein to receive the correspondingly dovetailed flange 16 so that the blocks may slide along the flange. Each block is further provided with an elongated, horizontally-disposed slot 21 through which extends the adjacent stud 14. Pivoted at 22 to each clamp block is an eccentric cam lever 23 having an elongated slot 24 therein through which the adjacent stud 14 also projects. The toe or band gripping end of each cam lever is preferably roughened or toothed as at 25.

From the description thus far given, the construction and operation of the band clamping and tension-devices will be readily understood. When the two clamps c are positioned substantially at the ends of the housing, or spaced their maximum distance, the cam levers thereof will appear as in Fig. 1, that is with the toe sections moved away from the foot plates so that the ends of the band may be readily slipped onto the foot plates beneath the cam levers. To both grip or clamp and tension or tighten the band it is now only necessary to swing the hand lever 10 inward toward the center line of the housing, thus actuating the rack and pinion mechanism, causing the two racks to move in opposite directions, with the head plates approaching each other and consequently, through the studs 14, shifting the clamps c along the dovetailed flange 16 and toward the center line of the frame. The initial movement of lever 10 causes the studs 14 to move toward each other and bear against the cam levers 23, rocking the latter so that the toes of the cam will approach the foot plates and grip the ends of the band. The inward travel of these studs thus causes the levers 23 to clamp the band, tending to hold the levers from further free movement, so that the further movement of lever 10 will cause the connected parts to pull the blocks toward each other, thus tensioning or drawing on the gripped band until the ends of the band are brought into desired overlapping relation as is shown for instance in Fig. 7, of the modified form. By such construction it will be noted that the greater the tensioning strain the tighter the clamps will bind or grip the band ends, slots 21 being of a sufficient length to permit the proper gripping action to take place.

In connection with the tensioning and clamping features of the tool I wish to direct particular attention to the fact that in use the base or bed plate A of the tool, which is intended to rest upon and be supported by the bale being banded, is flat and very thin, while the foot plates of the clamps which rest upon or in contact with this base, are also very thin, with the result that when the tool is in use there is no great or thick body of metal wedged or interposed between the band and the bale. Consequently, when the band has been fastened, as hereinafter described, and the tool removed by slipping it from beneath the band, the latter will be found to be tightly bound about the bale, instead of being loose or slack as would be the case with a tool having relatively thickened portions interposed between the surface of the bale and the band during the banding operation.

After the band has been tensioned with its ends in overlapping relation as before described such tension is maintained on the band by the locking pawl 12 engaging the ratchet wheel 11 and holding the same against backward rotation when the operator releases the hand lever 10. The band ends are now ready to be united or fastened together by suitable fastening devices, eyelets being employed in the present instance, although it is to be understood that other fastening devices, such as brads, staples, rivets and the like may be used if desired. When using eyelets it is preferred to perforate the ends of the band before setting the eyelet, and the perforating or punching mechanism as well as the eyelet setting mechanism embodied in my tool may be described as follows: The letter D indicates a sliding head of block-like form having its rear wall formed with a dovetailed recess 26 adapted to receive the dovetailed flange 16 of the housing so that such head may slide on the flange intermediate the two clamps c. This head has two spaced chambers 27 and 28 which lie side by side. By reference to Fig. 11 it will be seen that within the chamber 27 there is mounted a vertically slidable holder 29 carrying a perforating punch 30, said holder being maintained normally elevated to hold the punch in inoperative position by means of the spring 31. This punch holder 29 has a laterally projecting stop pin 32 which extends through the slot 33, the upward and downward movement of this pin and consequently the punch holder being limited by the end walls of the slot.

The other chamber 28, of the head block has mounted to slide vertically therein the eyelet punch holder 34 having a socket 35 (Fig. 13) in which is housed a coil spring 36 which bears at its lower end against the head 37 of the eyelet punch 38 the shank of which projects downward through a bore in the end wall 39 of the holder. This holder for the eyeleting punch is normally held in elevated and inoperative position by means of the spring 40 housed within the chamber 28. The eyelet punch holder also has a laterally extending stop pin 41 which projects through the vertical slot 42 in the front wall of the chamber and serves to limit the sliding movement of the holder as well as to trip the eyelet magazine M, as hereinafter described. At the bottom of the head block I provide an anvil plate 43 which projects beneath and is parallel with the bottom ends of the chambers 27 and 28 but is spaced apart therefrom for the insertion of the overlapping band ends. This anvil plate carries a die 44 coöperating with the punch 30, and an eyelet upsetting anvil 45 coöperating with the eyelet punch 38. At the bottom of the chamber 27 is a plate 46 having an opening 47 therein alining with the bore 48 of the die 44 through which opening 47 the punch 30 may be caused to project. One side edge of this plate 46 is recessed as at 49, as best seen in Fig. 15, the end walls of the recess supporting a pintle 50 on which is hinged a small gate 51 having a coil spring 52 normally tending to throw said gate into an approximately horizontal position. The opposite or free edge 53 of this gate, projects a short distance beyond the open bottom end of the chamber 28, as shown in Fig. 16, so that at certain times, as hereinafter described, said edge portion of the gate will be struck by the lower end of the descending eyelet punch holder and moved downward against the action of the spring 52 to release the eyelet, for the purpose of this shouldered gate 51 is to assist in supporting and guiding an eyelet such as is shown at E when the latter is to be swaged to unite the ends of the band, as is illustrated in said Fig. 16, the band ends being shown at F. The operation of swaging the eyelet will be described hereafter.

Connected with the upper portion of the head block at the eyeleting side of the latter is an upstanding bracket 55 the parallel arms of which carry at their top end portions a cross pin 56 on which is pivoted to swing or rock the eyelet magazine M, a coil contraction spring 57 normally tending to draw or throw the lower or discharge end of the magazine inward beneath the head block or into the path of movement of the eyelet punch. This magazine in the present instance preferably comprises a long flat tube, or a tube which is substantially rectangular in cross section, and is preferably made up of built up plates or strips, so that the longitudinal passage through the tube is in the nature of a T-shaped slot 58. The eyelets, which are preferably tubular eyelets, are intended to be inserted in this magazine as shown in Figs. 1 and 15, that is so that the shanks of the eyelets will project through the reduced or constricted section of the T-shaped slot at the back of the tube. Thus a great many eyelets may be inserted in the magazine, and they will feed one by one, by gravity, to the discharge end of the magazine. After the eyelets have been inserted in the magazine they may be prevented from accidental discharge through the mouth or top of the slot, as by the accidental overturning of the tool, by means of a locking spring 59 which is fastened at 60 to the top of the magazine and has a locking shoulder 61 which normally projects through the slot 62 and into the T slot in the magazine. When the magazine is to be loaded this spring may be pressed out of the way, and after the magazine has been filled this locking spring on being released will spring into locking position thus forming an obstruction across the mouth of the magazine. The lower portion of the magazine is gradually curved inward as indicated at $m$ and at its discharge end one of its back wall sections is shouldered or cut away as at 63 so as to receive the adjoining shoulder 64 of the head block, the inward swinging movement of the magazine being limited by the contact of these two shoulders. By reference to Figs. 14 and 15 it will be seen that this shouldered wall section which is indicated at 65 is shorter than the corresponding back wall section 66, the latter having a prolonged terminal edge 67 which is adapted to mate with the shouldered edge of the gate 51, as shown in Fig. 14, so that when the lower end of the magazine is at the limit of its inward throw the discharge end of the magazine will lie almost in abutting relation with the adjacent edge portion of the pivoted gate 51.

The prolonged terminal end of the wall section 66 of the magazine has eccentrically pivoted to the underside thereof, as at 68, a small eyelet-stop plate 69, which is of approximately quadrant-like shape, but has a tongue 70 which normally projects across the open discharge end of the slot and engages with the shank of the adjacent eyelet or that eyelet which is ready to be discharged from the magazine and swaged in the overlapping ends of the band. This stop plate also has a recess 71 formed in one edge thereof which seats the stop pin 72 when the plate is in its normal, eyelet-stopping position, a small spring 73 bearing against the curved edge of the plate for the purpose of holding the latter in such position.

From what has been thus far said it will be noted that the head block which carries both the perforating punch and the eyelet upsetting or swaging punch, also carries the eyeleting magazine so that the latter will move bodily relative to the frame with the head block when the latter is shifted along the horizontal dovetailed flange 16. It will further be noted that this magazine may be rocked or swung on its pivot 56 to bring its discharge end, and consequently to place the first eyelet at the discharge end in position for the swaging of the eyelet by the eyelet punch, the eyelet being held in such position by the discharge end of the magazine and the gate 51, as well as by the stop plate 69 as is clearly shown in Figs. 13 to 16 inclusive.

Now, in the present embodiment of the invention both the perforating punch and the eyelet upsetting or swaging punch are operated by a device common to both, preferably consisting of a plunger 75, reciprocating in the tubular post 2, the head of this plunger having a beveled edge 75' in order that the plunger and the punch holders may properly register in operation, thus insuring that the punch holders will be properly positioned when the plunger enters at the top of the chambers 27 and 28 of the sliding head block to strike and depress the punch holders therein. In order to reciprocate this plunger suitable mechanism is employed such as, for instance, the operating lever 77 having a bifurcated head 78 which spans the top portion of the post 2, a cross pivot 79 passing through the post and through the arms of the bifurcated end of the lever and thus pivotally connecting this lever to the top of the post. This post, below the point of connection of the lever, has alining elongated slots 80 formed in the opposite faces thereof, and through the slots 80 passes a cross pin 81, this pin uniting the lower ends of the pair of spaced links 82, which lie one at each side of the post, the upper ends of said links being connected with the bifurcated head of the lever by the pin 83, so that these links 82 form a toggle mechanism in connection with the pivoted bifurcated head of the lever. The cross pin 81 also passes transversely through and consequently carries the plunger 75. Thus, by reference to Fig. 1, it will be seen that by depressing the operating lever 77, the toggle link connection of the lever with the plunger will be straightened out or lengthened and the plunger depressed into contact with which ever punch holder may be there beneath, in turn depressing or driving such punch holder with its punch downward to perform its intended punching function. When the pressure on the handle 77 is released the lever is thrown upward again to draw the plunger into inoperative position ready for the next stroke, this upward movement of the lever and the plunger being accomplished by means of a relatively powerful coil spring 84, one end of which is hooked as at 86, to the cross pin 81.

As before stated the discharge end or eyelet placing end of the magazine is normally swung, by means of the spring 57, into eyelet placing position directly beneath the eyelet setting punch, when this punch is in position to be struck by the plunger, as is shown in Fig. 1. Referring to said Fig. 1, it will be seen that to the outer side wall of the magazine at the discharge end is attached a cam member which in the present instance is in the form of a horizontally disposed diamond shaped plate 85. Now as the punch is depressed under the action of the plunger the projecting end of the lateral pin 41 will strike the upper inclined edge 86 of this cam plate, and continuing its downward movement and bearing against such plate edge will force the discharge end of the magazine away from the punch, the magazine rocking on the pivot 56. At this time of course the end of the punch has engaged the tubular rivet as is shown in Figs. 13 and 16, and as the discharge end of the magazine moves away from the punch the eyelet will be pulled out from the magazine, the shank of the eyelet striking the tongue 70 of the stop plate 69, as shown in Fig. 15, will rock this plate around its pivot 68. This will permit the eyelet to be withdrawn from the magazine by the punch in its downward movement and at the same time the curved edge of the stop plate will ride between the eyelet being withdrawn and the adjacent eyelet and prevent the latter leaving the magazine, as will appear in said Fig. 15. It will further be seen, by reference to Fig. 16, that as the punch carries the eyelet downward the beveled end 34' of the punch holder will contact with the gate 51, and move the latter away from the eyelet head thus permitting the punch to freely set such eyelet. As the eyelet is driven through the perforations the end of the shank will be upset on the anvil 45, thus swaging the eyelet and securely uniting the band ends. The cam plate at the discharge end of the magazine is preferably provided with a lateral finger plate 87 by means of which the magazine may be bodily rocked on its pivot 56.

In Fig. 1 it will be noted that the eyelet setting punch is disposed beneath the plunger. In order to shift or slide the punch-carrying head block D, to bring the other or perforating punch beneath the plunger and of course to move the eyelet setting punch away from the plunger, I provide a trigger 88 which is connected to one end of the shaft 89, this shaft passing through a bearing 90 bolted on top of the housing. The outer end of this shaft 89 has fast therewith an arm 91 the free end of which carries a roller 92 mounted on a stud shaft 93, a nut 94 securing the shaft to the arm 91. This roller is adapted to ride in the curved way 95 cut in the angular rock-plate 96, the latter being pivoted at its heel, as at 97, to the side of the housing, as shown in Fig. 2. Pivotally connected to the straight arm 98 of the rock plate, as at 99, is one end of the link 100, the opposite end of the link being connected to a pin 101 which passes through alining, horizontally disposed, elongated slots 102 cut in the vertical walls of the housing, the opposite end of this pin being socketed in the back of the punch-carrying head block. Turning to Fig. 1 it will be seen that when the eyelet punch is beneath the plunger, the perforating punch is to one side thereof, in the present instance the left side, while the toggle, formed by the link 100 and the arm 98 of rock plate 96, is broken or shortened as shown in dotted lines in said figure. Now if the trigger 88 in Fig. 1 be pulled to the left, or to the position shown in Fig. 2 the roller 92 at the end of the trigger will bear against the arm 98 of this rock plate, and rocking the latter on the pivot 97 will straighten or lengthen the toggle connection thus shifting the head block to the position indicated in dotted lines in Fig. 2, the roller 92 seating or catching in the depression 98'. At this time the perforating punch will be beneath the plunger, while the eyelet-setting punch will have moved from beneath the punch, until the upper end of the magazine contacts with the lateral end 103 of the standard 104 which is socketed in the top of the housing, this standard acting as a stop for the magazine, and when the upper end of the latter contacts with this lateral end 103 of the standard, the lower or discharge end of the magazine will be swung or moved away from the eyelet punch.

Of course when the trigger 88 is pulled in the reverse direction or back to the position shown in Fig. 1, the head block will again be shifted to change the position of the two punches relative to the plunger, and in this instance the coil contraction spring 105 will act to break the link the instant the trigger is tilted or snapped from the seat 98' of the rock plate arm 98, thus insuring the rapid and positive shifting of the punch-carrying head block.

Under some conditions, as when inserting eyelets in heavy or thick bands of metal, the perforating punch might have a tendency to stick in the metal, and to obviate this I employ a pull bar link 106, the lower end of which is connected to the pin 32, while the upper end has an elongated slot 107 through which passes the cross pin 81.

It will be readily understood that when the perforating punch is directly beneath the plunger, the link 106 will occupy a substantially vertical position so that after the plunger and punch have been depressed the upward or return movement of the hand lever 77 will cause an upward pull on this link and insure that the punch will be positively withdrawn from the band. When however the perforating punch is in operative position as shown in Fig. 1 this pull bar will be slightly inclined to the vertical, and because of the elongated slot 107, and its pivotal connection with the pin 32 will not impede the downward movement of the plunger.

The above is a description of the structural features of my invention in its preferred form, the operation of this preferred form being briefly as follows: In using the tool, the latter which is of course portable, is placed upon the top of the bale to be banded, and the band is then placed about the bale with the free ends projecting toward each other as usual, such free ends being inserted between the cam levers and the foot plates of the gripping devices or clamps. If desired, the cam levers may be swung manually on their pivots to grip the ends of the band. The hand lever of the rack and pin mechanism is now operated to actuate such mechanism and the two clamps or gripping devices are drawn toward each other consequently tensioning the band, this tensioning movement continuing until the band ends are brought into the desired overlapping relation. The locking dog 12 is engaged with the ratchet wheel 11 to hold the tension, and the band is now ready for perforating. This is accomplished by throwing the finger 88 to the position shown in Fig. 2 and thus through the head block shifting mechanism bringing the perforating die directly beneath the plunger. The hand lever 77 is now depressed and the plunger striking the perforating punch drives the latter through the band ends making registering perforations therein. The hand lever 77 on being released will be drawn back to its normal elevated position shown in Fig. 1 by means of the spring 84, or if necessary, may be pulled upward and the perforating punch withdrawn from the band, this withdrawing movement of the punch being assisted by the pull bar link 106. The trigger 88 is now tripped to the position shown in Fig. 1 so that the head block shifting mechanism will move such head block into position to draw the eyelet setting punch directly beneath the plunger while the eyelet placing end of the magazine will be swung inward beneath the punch so that the first eyelet at the discharge end of the magazine will lie directly beneath the punch. The handle 77 is again pressed and the plunger striking the eyelet setting punch will drive the eyelet through the perforations in the band ends, the end of the shank of the eyelet being swaged, flanged or upset against the anvil block 45. The handle 77 is then again released and thrown upward into its normal position, while the second eyelet will move down in position to take the place of the swaged eyelet.

The tool may then be removed or slipped from beneath the band, if the tension on the band has been released by disengaging the pawl 12 from the ratchet wheel 11.

The foregoing description is particularly applicable to the preferred embodiment of the invention best illustrated in the assembled condition in Figs. 1-4 inclusive. The main distinction between this preferred form and the modified tool shown in Figs. 7-12 inclusive, with details of the head block shifting mechanism shown in Figs. 17-20 inclusive, is that instead of manually shifting the punch carrying head block relative to the plunger by mechanism operated through a trigger, I dispense with this trigger operated head shifting mechanism and substitute therefor certain other devices by means of which the punch carrying head block is automatically moved or shifted relative to the plunger upon each up-stroke of the plunger elevating stroke of the operating handle 77'. This mechanism for automatically shifting the head block in the present instance embraces certain assembled elements by means of which the vertical movement of the plunger on its up-stroke is translated into the horizontal movement imparted to the head block. This mechanism for automatically shifting the head block in the present instance includes a bracket 110 to which is pivoted at 111', an arm 111, having a head 112 at its inner end which has a recess 113 opening through the under side of the head, this recess receiving the plunger carrying cross pin 81'. The opposite end of this arm has an elongated slot 114 through which passes the coupling pin 115 carried by block 116 at the upper end of the vertical reciprocating bar 117. This bar 117 slides in a groove or way 118, cut vertically in the back plate 119, which is located at one side of the housing as shown in Fig. 11. Fastened to the outer face of this back plate is the intermediate slotted plate 120 shown in detail in Fig. 19, this plate having a relatively large flared slot 120' cut therein, the converging walls 121 of the slot merging at the central vertical slot 122 opening through the top edge of the plate. Below the straight bottom wall 123 of the slot is an elongated rectangular slot 124, while 125 is a vertical slot opening through the center of the bottom edge of the plate. This plate carries two pairs of laterally projecting bored ears shown at 126 and 127 respectively. Imposed on this intermediate plate is a front plate 128 having a pair of slots 129 for the passage of the ears 126, the bottom of this front plate having oppositely curved edge portions 130 and 130' forming the top wall of an arrow-shaped cam groove 131, the lower wall of which is formed by the top edges 132 and 132' of the skeleton plate shown in Fig. 18, this figure being a view of the back face of the plate. The lug 133 at the apex of the skeleton plate will bear lightly against the reciprocating bar 117, thus guiding the latter in its groove while the lugs 134 of the skeleton plate will fit in the elongated slot 124 of the plate 120 so that this plate will be guided in its limited lateral sliding movement on the plate 120. The ears 126 carry a horizontal rod 135 which passes through the sleeve 136 of the block 137 of which block a detail rear view is shown in Fig. 17. This block may thus slide on the rod 135 and also has a pair of perforated ears 138 and 138' to permit the block to slide upon and be guided by the horizontal rod 139 carried by these ears, this rod 139 being parallel with the rod 135. The rear face of this block 137 has an approximately rectangular recess 140 cut therein and forming vertical side flanges 141—141', while 142 is a lug projecting laterally from the rear face of the block and adapted to extend into the triangular recess 133' of the skeleton plate 132 when the parts are assembled. The lower end of this block 137 has a V shaped extension formed by the converging side edges 143—143' while the ears 138 at each side of these edges have small lugs 144—144' depending therefrom, these lugs forming open-ended recesses 145—145' in conjunction with the adjacent side walls of the depending extension of the block. As shown in Fig. 20 the reciprocating bar 117 carries an arm 117', which is pivoted at 146 to swing freely, this arm having at its free end a pin 147 which is adapted to ride in the arrow head cam slot formed as before described, while the lower end of the bar 117 has a laterally extending toe 148, which is adapted in the vertical reciprocation of the bar to ride in the slot 125 of the plate 120 and to alternately enter and be temporarily located in the recesses 145—145' of the block 137. Pivotally connected with the pin 147 is a link 149 having at its opposite end an angular head 150 carrying the sleeve 151 which fits over and connects the link to the stud shaft 104' which passes through alining elongated slots 105' in the housing and is socketed in the back of the punch carrying head block. Now, when the parts of this automatic block shifting mechanism are assembled as shown in Figs. 9, 10 and 11 it will operate and shift the block as follows: Turning to Figs. 9 and 10 it will be seen that the operating lever 77' is in its inoperative or elevated position. At this time the slotted end of the arm 111 is elevated because the reciprocating bar 117 has been pulled to its elevated position by the coil contraction spring 152, which is connected at its lower end to pin 153 and at its upper end to the top portion of the standard 154 mounted on the housing. At this time the other parts of the mechanism appear as shown in said figure. Now, at this time the head block will be in position to hold the perforating punch beneath the plunger, while the eyeleting punch will be to one side of the plunger with the top of the magazine resting against its stop standard. When the lever 77' is depressed to operate the perforating punch no shifting of the head block will take place because the pin 81' which connects the block shifting mechanism to the plunger will pass idly through the open bottom of the recess 112. However, during the plunger elevating stroke of the operating lever 77' the pin 81' contacting with the top curved wall of the recess, as shown in Fig. 10, will rock the arm 111 on its pivot 111', thus depressing the slotted end against the tension of the spring 152, as shown in Fig. 10. This will cause the lateral pin 147 of the swinging arm 117' of the vertical bar 117 to strike against the flange 141, forming the side wall and recess of the block 137, and as the bar 117 continues its downward movement the pin striking the sloping bottom wall of the arrow-shaped slot to the right of the apex thereof in Fig. 9, will travel down this wall and push the block 137 to the right as shown in Fig. 10. As the link 149 is connected with this block it will also be pulled to the right thus drawing the pin 104', and consequently the head block so as to bring the eyeleting punch beneath the plunger. Now when the next down stroke of the operating lever 77' is made to drive the plunger against the eyelet punch the spring 152 will draw up the bar 117, but this will be an idle movement in the sense that it will not result in any shifting of the link 149 but on the contrary, the toe 148 of the bar 117 will move upward in the slot 125 of the plate 120 and into the alining recess in the sliding block 137, thus holding or locking said block against sliding movement so that the punch carrying head block will be held securely in operative position relative to the plunger. On the next up-stroke of the lever 77', occurring after the latter is released when the setting of the eyelet has been completed, the automatic shifting of the head block will again take place, but in the reverse direction to that described as the block 137 will shift to the opposite side of the arrow-shaped cam, or to that side shown in Fig. 9 and the connections between this block 137 and the head block will be correspondingly actuated to shift the head block. In connection with this modified form I also provide means for positively withdrawing both the perforating punch and the eyeleting punch from the engagement with the overlapping strap ends and the swaged eyelet respectively. As will be seen by reference to Figs. 7 and 8 this means embraces a flat elongated segmental pull bar 155, the upper end of which has a slot 156 cut therein through which projects the pin 79', which pivots the operating lever 77' to the top of the supporting post. The foot of this bar 155 is provided with laterally extending toes 156 and 156' adapted to engage with the laterally projecting pins of the perforating punch and the eyeleting punch respectively. This bar 155 is pivoted on the pin 81'. Now on the down stroke of the plunger, as shown in Fig. 7, the bar 155 is carried downward until the pin 79' abuts against the top wall of the slot 156 and as will be seen by the said Fig. 7, the toe 156 will lie directly beneath the lateral pin of the punch holder which at this time is at the bottom of the slot. On the up-stroke of the lever 77' this toe in the corresponding upward movement of its bar 155 will engage the pin and positively pull upward on the punch holder, thus disengaging the punch from the strap ends. When the head block is shifted to bring the eyelet setting punch in position, as shown in Fig. 8, the same action will take place, only in this case the lateral pin of the holder of the eyelet punch will be engaged by the toe 156' and provide a pull exercised to disengage the eyelet punch from the eyelet. Of course, normally the springs of the holders, located within the respective chambers of such holders are sufficient for this disengaging purpose, but the means which is described is employed to supplement the disengaging action of such springs and to insure the positive withdrawal of the punchers.

The general operation of this modified form of the invention is substantially the same as that described for the preferred form of the tool with the exceptions above pointed out as to the shifting of the punch carrying head block and the withdrawal mechanism for the punches.

In connection with the invention I do not wish to be understood as limiting myself to a tool having all the features combined in the manner herein shown and described as I am aware that certain features may be employed without others, as for instance, the strap tensioning means may be employed without the specific strap connecting or attaching means, as also may the latter means be employed and utilized without the tensioning means.

Furthermore, I wish it to be understood, that I do not confine myself to all the precise details of construction herein set forth by way of illustration, as modification and variation may be made without departing from the spirit of the invention or exceeding the scope of the appended claims.

What I claim is:

1. In a tool for tensioning and attaching the ends of a band, means for imparting tension to the overlapping ends of a band, and means, forming a part of the tool, for fastening the ends of the band together while said ends are held under tension.

2. In a tool for tensioning and attaching the ends of a band, means for gripping the ends of the band in overlapping relation, means for tensioning said band, and means, forming a part of the tool, for uniting the ends of the band together in tensioned relation, said last named means being operable independently of the tensioning means.

3. In a tool for tensioning and attaching the ends of a band, means for gripping the ends of the band, means for drawing the ends of the band toward each other into overlapping relation, and means independent of band manipulation for uniting the ends of the band while held under tension.

4. In a tool for tensioning and attaching the ends of a band, means for gripping the ends of the band, means for actuating the gripping means to draw the ends of the band toward each other into overlapping relation, and mechanism for applying a fastening device to the ends of the band to unite the latter while the tension is maintained on the band.

5. In a tool for tensioning and attaching the ends of a band, means including gripping devices for bringing the ends of the band into tensioned overlapping relation, and a mechanism for applying a fastening device to the overlapping ends of the band to unite the latter while held by the gripping devices.

6. In a tool for tensioning and attaching the ends of a band, gripping devices for clamping the ends of the band, means for moving the gripping devices to apply tension to the band to draw the ends of the latter into overlapping relation, and means for inserting a fastening device in the overlapping ends of the band while the tension on the latter is maintained.

7. In a tool for tensioning and attaching the ends of a band, the combination with means for drawing the ends of the band into overlapping relation and for tensioning the band, of means for perforating the tensioned overlapping ends of the band, and mechanism for passing a fastening device through the perforations and swaging such fastening device to unite the ends of the band while the latter are under tension.

8. In a tool for tensioning and attaching the ends of a band, the combination with a pair of spaced gripping devices adapted to grip the ends of the band, of means for actuating the gripping devices to draw the ends of the band toward each other under tension, and means independent of band manipulation and located intermediate the gripping devices for applying a fastening device to the ends of the band to unite the latter while the band is under tension.

9. In a tool for tensioning and attaching the ends of a band, the combination with the means for tensioning the band to draw the ends of the latter into overlapping relation, means for perforating the overlapping ends of the band, and means for passing an eyelet through the perforations and swaging said eyelet to unite the band ends while the latter are under tension.

10. In a tool for tensioning and attaching the ends of a band, the combination with means for applying tension to the band to draw the ends of the latter into tensioned overlapping relation, means for perforating the overlapping ends of the band, means for feeding an eyelet in alinement with the perforations in the band, and means for driving said eyelet through the perforations to unite the ends of the tensioned band.

11. In a tool for tensioning and attaching the ends of a band, the combination with a pair of spaced gripping members, rack and pinion mechanism for actuating the gripping members to move the latter toward each other and draw the ends of the band together under tension, said pinion mechanism having the axis of pinion movement parallel to the direction of width of the band, and means independent of band manipulation and located intermediate the gripping members for applying a fastening device to the band ends to unite the latter while under tension.

12. In a tool for tensioning and attaching the ends of a band, the combination with spaced gripping members, mechanism for causing the gripping members to clamp the band ends and simultaneously move the gripping members toward each other to draw the ends of the band into tensioned overlapping relation, perforating mechanism for perforating the overlapping ends of the band, and eyelet setting and swaging mechanism for passing an eyelet through the perforations and swaging said eyelet to unite the overlapping ends of the band.

13. In a tool for tensioning and attaching the ends of a band, the combination with a pair of gripping devices having relative movement and adapted to draw the ends of the band into tensioned overlapping relation, of a band perforating punch operable to perforate the ends of the band, an eyelet setting and swaging punch operable to pass an eyelet through the perforation and swage the eyelet to unite the overlapping ends of the band, and mechanism for actuating the punches.

14. In a tool for tensioning and attaching the ends of a band, the combination with a frame, of means including a sliding gripping device adapted to tension the band and draw the ends of the band toward each other into overlapping relation, and mechanism, including a plunger device, for applying a fastening device to unite the ends of the band while the latter are under tension.

15. In a tool for tensioning and attaching the ends of a band, the combination with a frame, of means carried by the frame for applying tension to the ends of the band to draw the latter into tensioned overlapping relation, and means including a plunger and a punch driven thereby for inserting a fastening device through the overlapping ends of the band to unite such ends while under tension.

16. In a tool for tensioning and attaching the ends of a band, the combination with a suitable frame, of means carried by the frame for applying tension to the ends of the band to draw the latter into tensioned overlapping relation, means including an eyelet setting device and mechanism for actuating the latter to set an eyelet in the overlapping ends of the band to unite the latter while under tension, and means for feeding eyelets to the setting device.

17. In a tool for tensioning and attaching the ends of a band, the combination with means for applying tension to the ends of the band, and means for applying an eyelet to unite the ends of the band while under tension, said latter means including a shiftable member, an eyelet setting mechanism carried by the shiftable member, actuating devices for the eyelet setting mechanism, and means for actuating the shiftable member to bring the eyelet setting mechanism into operative position relative to the actuating devices of the eyelet setting mechanism.

18. In a tool of the class described, the combination with means for applying tension to a band to draw the ends of the latter into overlapping relation, of a shiftable member movable relative to the overlapping ends, band-perforating devices carried by the shiftable member, eyelet setting devices also carried by the shiftable member, mechanism common to both the perforating devices and the eyelet setting devices for operating said devices, and means for moving the shiftable member to selectively bring said devices into operative position relative to the common operating mechanism.

19. In a tool of the class described, the combination with a pair of spaced gripping devices adapted to clamp the ends of a band, and means for actuating the gripping devices to draw the ends of the band into overlapping relation, of a shiftable member located between the gripping devices, a plurality of punch devices carried by the shiftable member, mechanism for operating all of the punch devices, and means for moving the shiftable member to selectively bring the punch devices into operative position relative to the operating mechanism of said devices.

20. In a tool of the class described, the combination with a frame, of a pair of slidable gripping devices carried thereby and adapted to clamp the ends of a band, means for sliding the devices to draw the ends of the band into overlapping relation, a sliding head located between the sliding gripping devices, a plurality of punches carried by the sliding head, a plunger common to said punches for actuating the latter, means for moving the sliding head to bring the punches one at a time into operative position relative to the plunger, and means for actuating the plunger to operate that punch which is in operative position relative to the plunger.

21. In a tool of the class described, the combination with a suitable support, of means carried thereby for gripping and tensioning the ends of a band, and means for applying an eyelet to the ends of the band to unite the latter while under tension, and said means including a perforating device, an eyelet-setting device, a means for supplying eyelets one at a time to the eyelet-setting device, means for guiding and holding each eyelet in position to be operated upon by the eyelet setting device, and means for actuating the perforating device and the eyelet-setting device.

22. In a tool of the class described, the combination with means for applying tension to the ends of a band to draw the latter toward each other, of means for applying a fastening device to connect the ends of the tensioned band, said means including a punch, a magazine for supplying the fastening devices one at a time to the punch, and mechanism for driving the punch.

23. In a tool of the class described, the combination with means for applying tension to the ends of a band to draw the latter into overlapping relation, of a movable head located adjacent the overlapping ends of the band, a perforating punch carried by said head, an eyelet setting punch also carried by said head, a magazine supported from said head and having its discharge end movable into and out of eyelet placing position relative to the eyelet punch, a punch operating plunger common to both the perforating punch and the eyelet-setting punch, means for selectively bringing the perforating punch and the eyelet-setting punch into position to be actuated by the plunger, and means for operating the punch.

24. In a tool of the class described, the combination, with means for applying tension to the ends of a band to draw the latter into overlapping relation, of means for uniting the ends of the band while under tension, said means including a fastener-applying punch, a magazine for the fasteners having a discharge end adapted to be moved into and out of eyelet-placing position relative to the punch, and mechanism for driving the punch to remove an eyelet from the discharge end of the magazine and to apply said eyelet to the overlapping ends of the band.

25. In a tool of the class described, the combination with means for applying tension to the ends of a band, to draw the latter into overlapping relation, means for applying an eyelet to unite the ends of the band while the latter is under tension, said means including an eyelet punch, a plunger for actuating the latter, a magazine for the eyelets having a discharge end movable into and out of eyelet-placing position relative to the plunger, means adjacent to the discharge end of the magazine for guiding the eyelet into and holding said eyelet in position to be struck by the punch and means for actuating the plunger to drive the punch.

26. In a tool of the class described, the combination with a frame, of means carried thereby for tensioning the ends of a band, a sliding head block, a pair of punches carried by said head block, a plunger for operating said punch, a lever for operating the punch, means for sliding the same to selectively bring the punches in position to be operated upon by the plunger, and means for feeding fastening devices to one of said punches when the latter is in operative position relative to the plunger.

27. In a tool of the class described, the combination with a pair of gripping members adapted to clamp the ends of a band, means for moving said gripping members to draw the ends of the band toward each other, a head block sliding between said members, and having an anvil plate on which the ends of the tensioned band may rest, a pair of reciprocating punches mounted in said head block, a reciprocating plunger common to both of said plungers, means for sliding the head block to bring the punches one at a time into position to be operated upon by the plunger, means for operating the plunger to drive the punches toward the anvil plate, and means for feeding fastening devices into position to be operated upon by one of said punches.

28. In a tool of the class described, the combination with a perforating punch and an eyeleting punch, mechanism for actuating the punches, means for selectively bringing the punches into operative position relative to the actuating mechanism thereof, and means for feeding eyelets to the eyelet punch when the latter is in operative position relative to its actuating mechanism.

29. In a tool of the class described, the combination with a suitable support, of a sliding member carried thereby, a pair of punches carried by said member, a plunger common to both of said punches for actuating the latter, means for sliding the member to selectively bring the punches into operative position relative to the plunger, and a magazine for feeding fastening devices one at a time to one of said punches when the latter is in operative position relative to the plunger.

30. In a tool of the class described, the combination with a base plate, of a pair of spaced gripping members located above the base plate, each of said members having a relatively thin foot plate imposed upon the base plate, a sliding head block having an anvil plate substantially equal in thickness to the foot plates of the gripping members, a pair of reciprocating punches carried by the head block and adapted to be driven toward the anvil plate, a vertically reciprocating plunger for driving said punches, means for moving the head block to selectively bring the punches into alinement with the plunger, a support carried by the head block, a fastener magazine pivoted to rock upon this support and adapted to present a fastener to one of said punches when said punch is in operative position relative to the plunger.

31. In a tool of the class described the combination with a reciprocating plunger, of a member slidable relative to the plunger and a pair of reciprocating punches carried by the sliding member, and means for automatically bringing one or the other of the punches into operative position relative to the plunger.

32. In a tool of the class described, the combination with a vertically disposed reciprocating plunger, of a horizontally sliding head block, a pair of vertically reciprocating punches carried by the head block and adapted to be moved one at a time beneath the plunger and to be actuated on the down stroke of the plunger, and means for automatically sliding the head block to bring a selected punch into operative position directly beneath the plunger.

In testimony whereof I have hereunto set my hand.

GEORGE M. WILLIAMS.